United States Patent [19]
Hayashida et al.

[11] Patent Number: 5,736,260
[45] Date of Patent: Apr. 7, 1998

[54] MULTILAYER PACKAGING FILM

[75] Inventors: Haruo Hayashida, Chiba; Akihiro Ichige, Sodegaura; Takeshi Yamada, Suita; Kazuo Kondo; Teruo Tada, both of Marugame; Toyoki Wano, Zentsuji; Masaaki Zenigame, Marugame, all of Japan

[73] Assignees: Sumitomo Chemical Company, Limited; Okura Industrial Co., Ltd., both of Japan

[21] Appl. No.: 533,553

[22] Filed: Sep. 25, 1995

[30] Foreign Application Priority Data

Oct. 6, 1994 [JP] Japan .................. 6-268352

[51] Int. Cl.$^6$ .................. B32B 27/32; B65B 11/00
[52] U.S. Cl. .................. 428/516; 428/910; 426/127; 426/396
[58] Field of Search .................. 426/396, 127; 428/34.9, 515, 516, 349, 910, 35.2

[56] References Cited

U.S. PATENT DOCUMENTS

| | | | |
|---|---|---|---|
| 4,643,928 | 2/1987 | Kimura et al. | 428/36 |
| 5,279,872 | 1/1994 | Ralph | 428/34.9 |
| 5,300,353 | 4/1994 | Yoshimura et al. | 428/213 |
| 5,366,796 | 11/1994 | Murschall | 428/216 |
| 5,376,439 | 12/1994 | Hodgson et al. | 428/220 |
| 5,491,019 | 2/1996 | Kuo | 428/213 |

FOREIGN PATENT DOCUMENTS

| | | |
|---|---|---|
| 0450088 | 10/1991 | European Pat. Off. . |
| 0510213 | 10/1992 | European Pat. Off. . |
| 0538747 | 4/1993 | European Pat. Off. . |
| 0562496 | 9/1993 | European Pat. Off. . |
| 0597502 | 5/1994 | European Pat. Off. . |
| 0600425 | 6/1994 | European Pat. Off. . |
| 0622186 | 11/1994 | European Pat. Off. . |
| 0622187 | 11/1994 | European Pat. Off. . |
| 62-5620 | 2/1994 | Japan . |
| 9409060 | 4/1994 | WIPO . |

OTHER PUBLICATIONS

Van der Sanden et al. "A new family of linear ethylene polymers provides enhanced sealing performance", Tapi Journal pp. 99–103 Feb. 1992.

*Primary Examiner*—Paul J. Thibodeau
*Assistant Examiner*—D. Lawrence Tarazano
*Attorney, Agent, or Firm*—Lorusso & Loud

[57] ABSTRACT

A laminated film useful for packaging includes two outer layers and a core layer of a polypropylene resin interposed therebetween. Each of the outer layers includes (A) an ethylene-α-olefin copolymer having a density of less than 0.910 g/cm$^3$ but not less than 0.870 g/cm$^3$ and an ethylene content of at least 50 mol % and showing only one endothermic peak when analyzed by differential scanning calorimetry (DSC), (B) an ethylene-α-olefin copolymer having a density of 0.910–0.935 g/cm$^3$ and an ethylene content of at least 50 mol %, and (C) an anti-fogging agent. The density of (B) is greater by at least 0.008 g/cm$^3$ than that of (A).

4 Claims, No Drawings

MULTILAYER PACKAGING FILM

BACKGROUND OF THE INVENTION

This invention relates to a laminated film having excellent anti-fogging properties and lubricity useful for stretch packaging, stretch shrink packaging, etc.

Various films are now selectively utilized, according to respective characteristics thereof, for various packaging methods such as an overlapping method, a stretch wrapping method, a skin packing method and a sealing method in which a tubular film is used. For such packaging methods, single-layer films of, for example, polyethylene, polypropylene and polyvinyl chloride, have been used. However, recent demands for high quality packaging cannot be met by such single-layer films.

For packaging foodstuff such as vegetable, fruit, fresh fish, raw meat or cooked food directly or with a tray by stretch packaging or stretch shrink packaging, a vinyl chloride resin film has been mainly used. In view of the problems of safety, hygiene and prevention of pollution, however, films of a low density polyethylene or an ethylene resin such as an ethylene-vinyl acetate copolymer have recently developed as a substitute for the vinyl chloride resin film. The low density polyethylene resin, when used by itself for the formation of a packaging film, however, fails to simultaneously give satisfactory self-tackiness, adhesiveness at low temperatures and flexibility. With the ethylene-vinyl acetate copolymer resin, the above problem can be solved to some extent. However, the ethylene-vinyl acetate copolymer resin film has problems because of poor resistance thereof to puncturing by sharp edges such as tray edges and food edges and because of migration of acetic acid smell from the film to the packaged food.

Various attempts have been made to solve the above-described problems. For example, there have been proposals in which a plurality of resin layers are laminated to form multilayer films. In another type of proposals, a variety of additives are incorporated into the films.

Japanese Unexamined Patent Publication Nos. Hei 6-31882 and Hei 6-39973 disclose multilayer packaging films including an ethylene polymer layer and a propylene copolymer layer. Japanese Unexamined Patent Publication No. Hei 6-25620 discloses an improved self-tack film using two types of ethylene copolymers having different densities. It is also known to incorporate an anti-fogging agent into a packaging film to impart anti-fogging properties thereto.

However, the known laminated film composed of two outer ethylene resin layers each containing an anti-fogging agent and a propylene polymer core layer sandwiched therebeween fails to show both good anti-fogging properties and good lubricity. In particular, when the amount of the anti-fogging agent is increased to improve the anti-fogging properties and the lubricity against trays or other materials to be packaged, it becomes difficult to uniformly knead the raw material mixture, so that the extrusion rate tends to become irregular. On the contrary, when the amount of the anti-fogging agent is reduced to improve the extrusion moldability, the anti-fogging effect decreases and the lubricity becomes poor, either.

SUMMARY OF THE INVENTION

It is, therefore, an object of the present invention is to provide a laminated film, which has excellent anti-fogging properties, lubricity, gloss and haze and which can be adhered with each other when heated at a relatively low temperature.

Another object of the present invention is to provide a laminated film suitable for the automatic packaging of foodstuff-containing plastic trays by stretch packaging or stretch shrink packaging.

It is a further object of the present invention to provide a packaging film of the above-mentioned type which gives excellent packages capable of preventing the formation of dew when placed at ambient temperature after being stored at a low temperature.

In accomplishing the foregoing objects, the present invention provides a laminated film comprising at least three layers, wherein a core layer comprising a polypropylene resin is interposed between two outer layers, each of said outer layers comprising (A) an ethylene-α-olefin copolymer having a density of less than 0.910 g/cm$^3$ but not less than 0.870 g/cm$^3$ and an ethylene content of at least 50 mol % and showing only one endothermic peak when analyzed by differential scanning calorimetry, (B) an ethylene-α-olefin copolymer having a density of 0.910–0.935 g/cm$^3$ and an ethylene content of at least 50 mol %, and (C) an anti-fogging agent, the density of (B) being greater by at least 0.008 g/cm$^3$ than that of (A).

Other objects, features and advantages of the present invention will become apparent from the detailed description of the preferred embodiments of the invention to follow.

DETAILED DESCRIPTION OF THE PREFERRED EMBODIMENTS OF THE INVENTION

It is essential that the ethylene-α-olefin copolymer (A) of each of the two outer layers of the laminated film according to the present invention should have an ethylene content of at least 50 mol %, a density of less than 0.910 g/cm$^3$ but not less than 0.870 g/cm$^3$ and only one endothermic peak when analyzed by differential scanning calorimetry (DSC).

A density of the copolymer (A) below 0.870 g/cm$^3$ causes a difficulty in forming into a film. On the other hand, when the density is 0.910 g/cm$^3$ or more, the inter-layer adhesion between the outer layer and the core layer including the polypropylene resin is reduced to cause separation of the layers. In addition, the resultant film is not easily adhered with each other when heated at a relatively low temperature and the flexibility of the film will become worse. Therefore, such films are not suitable for use in stretch packaging or stretch shrink packaging.

The use of the ethylene-α-olefin copolymer (A) having only one endothermic peak in the DSC curve thereof in conjunction with the ethylene-α-olefin copolymer (B) having a higher density than that of (A), can provide an unexpected advantage that it shows both excellent anti-fogging properties and excellent lubricity while retaining excellent properties inherent to the copolymer (A) such as gloss, haze and adhesiveness upon being heated at a relatively low temperature.

More specifically, a laminated film whose outer layers are each composed only of an ethylene-α-olefin copolymer having only one endothermic peak in the DSC curve thereof (the copolymer (A)) has inferior anti-fogging properties and inferior lubricity as compared with a laminated film whose outer layers are each formed only of an ethylene-α-olefin copolymer having two endothermic peaks in the DSC curve thereof (copolymer (A')). However, it has been surprisingly found that, by incorporating the ethylene-α-olefin copolymer (B) into the outer layer, the laminated film using the combination of (A) with (B) shows (1) anti-fogging properties and lubricity which are comparable or slightly superior to those of the film using the combination of (A') with (B) and (2) gloss, haze and low temperature adhesiveness which are much superior to those of the film using the combination of (A') with (B).

Although not wishing to be bound to such a theory, it is believed that, in the laminated film whose outer layers are formed only of the copolymer (A), it is less easy for the anti-fogging agent (C) to bleed out to the surface of the film than in the case where the copolymer (A') is used as the outer layer. When the copolymer (A) is used together with the copolymer (B), however, the bleeding of the anti-fogging agent (C) becomes easier as compared with the case where the copolymer (A') is used together with the copolymer (B), since the solubility of the anti-fogging agent (C) in the resin mixture is lowered. In this case, the copolymer (B) which is not completely compatible with the copolymer (A) is considered to serve as an anti-blocking agent (C) so that the lubricity of the film is improved.

Furthermore, it is believed that, when the difference in density between the copolymer (A) and the copolymer (B) is within a specific range, the bledding of the anti-fogging agent (C) becomes easier and the transparency and mechanical properties of the resulting film are improved.

The differential scanning calorimetry (DSC) herein is carried out using a differential scanning calorimeter Model DSC 220C manufactured by Seiko Densi Kogyo in the following manner: a test sample (about 10 mg) is cut from a sheet (thickness: 0.5 mm) produced by hot press. The sample is placed in a sample pan, heated at 150° C. for about 5 minutes, cooled to 40° C. at a cooling rate of 10° C. per minute, allowed to stand at that temperature for 5 minutes and then measured at a heating rate of 10° C. per minute with the differential scanning calorimeter.

The ethylene-α-olefin copolymer (A) having only one endothermic peak can be prepared according to the method described in, for example, Japanese Unexamined Patent Publication No. Hei 2-77410. Namely, such a copolymer can be prepared by copolymerizing ethylene with an α-olefin having 3–10 carbon atoms in the presence of a catalyst system including a vanadium compound of the formula (I):

$$VO(OR)_n X_{3-n} \quad (I)$$

wherein R is a hydrocarbon group, X is a halogen atom and n is a real number of more than 0 but less than 3; an organoaluminum compound of the formula (II):

$$R'_m AlX_{3-m} \quad (II)$$

wherein R' is a hydrocarbon group, X is a halogen atom and m is a real number of more than 1 but less than 3; and an ester compound of the formula (III):

$$R''(C=O)OR''' \quad (III)$$

wherein R" is a hydrocarbon group of 1–20 carbon atoms which may have one or more halogen substituents and R'" is a hydrocarbyl group of 1–20 carbon atoms. The molar ratios of Al in (II) to V in (I) and of (III) to V in (I) in the catalyst system are not less than 2.5 and not less than 1.5, respectively. The reaction is performed at a temperature in the range of 40°–80° C. under conditions where both a hydrocarbon-insoluble polymer (slurry phase) and a hydrocarbon-soluble polymer (solution phase) coexist. A vanadium compound obtained by reacting vanadium trichloride with an alcohol according to the method described in Japanese Unexamined Patent Publication No. sho-60-226514 or a metallocene catalyst may be employed in place of the vanadium compound of the above formula (I).

The ethylene-α-olefin copolymer (A) is used in conjunction with the ethylene-α-olefin copolymer (B) having an ethylene content of at least 50 mol % and a density in the range of 0.910–0.935 g/cm³. A density of the copolymer (B) below 0.910 g/cm³ fails to obtain satisfactory anti-fogging properties and lubricity. When the density exceeds 0.935 g/cm³, not only the adhesiveness of the resulting film when heated at a relatively low temperature but also the transparency thereof decreases.

It is also necessary in the present invention that the density of the ethylene-α-olefin copolymer (B) should be greater by at least 0.008 g/cm³ than that of the ethylene-α-olefin copolymer (A). If the difference in density between the copolymer (A) and the copolymer (B) is less than 0.008 g/cm³, the desired improvement in the anti-fogging properties and lubricity can not be attained.

The weight ratio of the ethylene-α-olefin copolymer (A) to the ethylene-α-olefin copolymer (B) of the outer layers in the present invention is preferably in the range of 95/5 to 40/60, more preferably 90/10 to 50/50, most preferably 80/20 to 60/40. If the amount of the copolymer (B) is below this range, i.e. below 5 % by weight, an improvement of the resultant film in the anti-fogging properties and lubricity may be insufficient. If the amount of the copolymer (B) exceeds the above range, i.e. more than 60 % by weight, the inter-layer adhesion of the resultant film tends to decrease and the ply separation may occur. In addition, the adhesiveness at a low temperature and the flexibility required for stretching packaging or stretching shrink packaging will decrease.

Illustrative of suitable α-olefin monomers used to form the ethylene-α-olefin copolymers (A) and (B) are α-olefins having 3–10 carbon atoms such as propylene, butene-1, pentene-1, 4-ethylpentene, heptene-1, hexene-1 and octene-1.

The polypropylene resin used to form the core layer of the laminate film according to the present invention may be homopolymers and copolymers of propylene with an α-olefin. Examples of the propylene copolymers include a propylene-ethylene copolymer having an ethylene content of not more than 20 mol %, a propylene-butene-1 copolymer, a propylene-butene-1-ethylene terpolymer having a total content of butene-1 and ethylene of not more than 20 mol % and a propylene-α-olefin (having 5 carbon atoms or more) copolymer. Above all, the use of a propylene-ethylene copolymer having an ethylene content of 2–12 mol % is especially preferred for reasons of excellent transparency and mechanical strengths. The core layer may additionally contain other polymers such as polymers containing α-olefins, if desired.

The anti-fogging agent (C) used together with the copolymers (A) and (B) is not specifically limited, and any anti-fogging agent conventionally used in packaging films can be used for the purpose of the present invention. Examples of the anti-fogging agents (C) include polyglycerol fatty acid esters such as diglycerol monolaurate, diglycerol monooleate, diglycerol sesquilaurate, diglycerol sesquioleate, monoglycerol monolaurate and monoglycerol monooleate; polyethylene glycol fatty acid esters such as polyethylene glycol monolaurate and polyethylene glycol monooleate; polyoxyethylene glycol alkyl ethers such as polyoxyethylene lauryl alcohol ether and polyoxyethylene oleyl alcohol ether; and alkanols such as stearyl alcohol and oleyl alcohol. These anti-fogging agents may be used by themselves or in combination of two or more thereof.

An intermediate layer may be interposed between the core layer and at least one of the outer layers. Further, the core layer may be constructed into a three-layer structure in which an additional layer is sandwiched between two polypropylene resin layers. Such an additional layer is preferably made of a recycled resin from unacceptable products or chips and trimmings of the laminate layer of the present invention.

The thickness of the laminated film of the present invention is preferably in the range of 10–50 μm for the purpose of packaging. Preferred proportions in thickness of respective layers based on the total thickness are 5–40% for each of the outer layers and 90–20% for the core layer, for reasons of well-balanced physical properties of the laminated film.

Each of the layers constituting the laminated packaging film of the present invention may optionally contain various types of modifying agents for respective resins. In addition, one or more additives such as anti-oxidants, lubricants, anti-blocking agents, tackifiers may also be added.

The laminate film of the present invention may be prepared by any known method. For example, respective layers are first separately prepared by a blown film process or a T-die film process and then laminated together. Alternatively, the laminated film may be prepared using a blown film molding machine or a T-die film molding machine of a co-extrusion type adapted for producing a three-layer film with two kinds of resins or a five-layer film with three kinds of resins. It is also possible to prepare a laminated film by laminating a layer by an extrusion lamination process on a separately prepared film.

The laminated film of the present invention may be drawn in at least one direction, for example monoaxially or biaxially, to obtain a heat-shrinkable film. To obtain a monoaxially oriented film, a conventional roll stretching method is preferably adopted. In the case of a biaxially oriented film, there may be adopted a two-step stretching method in which a film is first stretched by tentering method in the machine direction and the resulting film is then stretched in the transverse direction, or a one-step stretching method in which the film is stretched simultaneously in the both machine and transverse directions. A tubular stretching method may be preferably used for the one-step method. Preferred drawing ratio in case of biaxial stretching is in the range of 2–30 magnification, especially 3–25 magnification in terms of the ratio of the area of the film after stretching to the area thereof before stretching.

The laminated film of the present invention is suitably used for packaging purposes. For example, the film may be employed for the stretch packaging, especially, of food. In this case, a tackifier is preferably incorporated into the outer layers to impart self-tackiness thereto. The laminate film which is imparted with heat-shrinkability may be suitably used for the stretch-shrink packaging of food. For this purpose, it is preferred to incorporate a tackifier into the outer layers and to draw the film in at least one direction to impart both self-tackiness and heat-shrinkable property thereto. The laminated film according to the present invention which exhibits excellent lubricity against foamed polystyrene trays is particularly suitably used for automatic trays packaging where food-containing trays are automatically packaged by stretch packaging or stretch shrink packaging. Because of excellent anti-fogging properties, the film wrapping the food can prevent the formation of dew drops on the surface thereof.

The following examples will further illustrate the present invention. Parts and percentages are by weight. The physical properties are determined as follows:

(1) Density

Density of a film is measured, after annealing the film in hot water at 100° C., according to the method of the Japanese Industrial Standards JIS K-6760.

(2) Tensile strength

Tensile strength is measured according to the method of ASTM D-882.

(3) Young's modulus

Young's modulus is measured according to the method of ASTM D-882.

(4) Haze

Haze is measured according to the method of ASTM D-1003. The smaller the measured value, the better is the transparency.

(5) Gloss

Gloss is measured according to the method of ASTM D-523. The larger the measured value, the better is the gloss.

(6) Anti-fogging properties

Anti-fogging properties are measured under an ordinary temperature condition, a low temperature condition and a frozen condition.

The anti-fogging properties under an ordinary temperature condition is performed as follows: Water at 70° C. is poured in a cup. The open end of the cup is covered with the test film. This is allowed to stand for 1 hour at a temperature of 20° C. The surface of the film is then observed for evaluating the degree of fogging.

The anti-fogging properties under a low temperature condition is performed as follows: Water at 23° C. is poured in a cup. The open end of the cup is covered with the test film. This is allowed to stand for 1 hour at a temperature of 5° C. The surface of the film is then observed for evaluating the degree of fogging.

The anti-fogging properties under a frozen condition is performed as follows: Ice is placed in a cup. The open end of the cup is covered with the test film. This is allowed to stand for 1 hour at a temperature of −15° C. The surface of the film is then observed for evaluating the degree of fogging.

The evaluation is rated as follows:

A: no fogging is observed

B: almost no fogging is observed (not detectable when observed at a specific angle)

C: slight fogging is observed

D: fogging is observed (7) Lubricity

The lubricity of the test film relative to a foamed polystyrene sheet is evaluated using a friction coefficient meter manufactured by Tester Sangyo in terms of a static coefficient of friction ($\mu s$) and as a dynamic coefficient of friction ($\mu k$). An average of the values obtained with sliding load of 69.35 g and 249.35 g is shown. The sliding speed is 150 mm/minute with a contact area of 600 $mm^2$ (2.0 mm×30 mm).

(8) Adhesiveness at Low Temperature

Trays containing articles are automatically wrapped with the test film using Tray Stretch Packaging Machine Model STC-111B manufactured by Oomori Kikai Inc. under the conditions given below. The minimum temperature required to produce good heat adhesion between overlapping portions of the test film on the back surface of the wrapped tray is determined.

Film width: 300 mm

Tray size: length 190 mm×width 110 mm×height 26 mm

Weight of the article to be packaged: 500 g

Packaging speed: 50 parcels per minute

Chute belt: about 15 m per minute (9) Stretch Shrink Packaging Test

Foamed polystyrene trays (250 mm×170 mm×15 mm) each containing 150 g of frozen acephalic lobsters are stretch packaged with the test film with a width of 450 mm using Tray Stretch Packaging Machine Model STC-111B.

More specifically, the test film is unwound from a roll to which the tray having the contents placed thereon is fed with the longitudinal axis of the tray being in parallel with the machine direction of the film. Both sides of the continuous film are lowered relative to the tray to enclose the contents and the tray together and are gathered at the backside of the tray. The film thus shaped into a tubular form is then cut at a position spaced at a distance away from each of leading and trailing ends of the trays. The cut portions of the film are each folded toward the back side of the tray. The folded portion and the gathered portions of the film on the back side of the tray are then pressed to a hot plate so that respective portions are adhered to the film located on the backside of the tray. The enclosed tray is passed through a heating tunnel at 90° C. with a residence time of 1 second.

EXAMPLE 1

A three layer film having two outer layers and a core layer sandwiched therebetween was prepared. Each of the outer layers consisted of an ethylene-butene-1 copolymer (copolymer (A)) having a density of 0.895 g/cm$^3$ and a butene-1 content of 5.3 mol % and showing only one endothermic peak at 85° C. when analyzed by DSC, an ethylene-hexene copolymer (copolymer (B)) having a density of 0.912 g/cm$^3$ and a hexene content of 4.5 mol % and showing two endothermic peaks at 82° C. and 119° C. in the DSC analysis, and a mixture (anti-fogging agent (C)) of 5 parts of diglycerol monooleate 3 part of polyethylene glycol monooleate and 2 parts of monoglycerol monooleate.

70 parts by weight of the copolymer (A) were blended with 30 parts by weight of the copolymer (B), to which the anti-fogging agent (C) was added to obtain a resin composition for outer layers having a content of the anti-fogging agent of 2 %. A propylene-ethylene copolymer having an ethylene content of 4.6 % was used for forming the core layer.

The resin composition for the outer layers was charged in an extruder having a screw diameter of 65 mm while the propylene resin for the core layer was charged in an extruder having a screw diameter of 40 mm. Both resins were melted and coextruded through a circular die having a diameter of 180 mm to obtain a tubular laminated sheet having a thickness of about 120 μm and a thickness proportion of 20 % for each outer layer and 60 % for the core layer. The width of the tubular laminated sheet when flattened was 300 mm.

The tubular laminated raw sheet thus obtained was stretched by a factor of 3.3 in the machine direction and by a factor of 3.1 in the transverse direction. The stretched film was then annealed for slight relaxation to obtain the three layer film having a total thickness of about 12 μm.

The thus obtained film was tested for various properties thereof to give the results shown in Table 1. As clear from Table 1, the anti-fogging properties and the lubricity of the film were excellent.

The laminated film was subjected to stretch shrink packaging of frozen acephalic lobsters placed on a foamed polystyrene tray. It was revealed that the laminated film had good lubricity relative to the tray and was suited for automatic packaging. The resultant packages did not show any droplets of water when the package was frozen and then allowed to stand at room temperature.

COMPARATIVE EXAMPLE 1

Example 1 was repeated in the same manner as described except that the ethylene-hexene copolymer (copolymer (B)) was not used. Thus, each of the outer layers of Comparative Example 1 consisted of the copolymer (A) and the anti-fogging agent (C). The properties of the laminated film thus obtained are shown in Table 1. As can be seen from Table 1, the anti-fogging properties and the lubricity of the laminated film of Comparative Example 1 were inferior to those of Example 1. The laminated film was also tested for stretch shrink packaging, revealing that the lubricity was poor so that the film was ill-suited for automatic packaging. The package showed formation of droplets of water when frozen and thereafter allowed to stand at room temperature.

COMPARATIVE EXAMPLE 2

Comparative Example 1 was repeated in the same manner as described except that an ethylene-butene-1 copolymer (copolymer A') having a density of 0.895 g/cm$^3$ and a butene-1 content of 7.0 mol % and showing two endothermic peaks at 105° C. and 115° C. when analyzed by DSC was substituted for the copolymer (A). Thus, each of the outer layers of Comparative Example 2 consisted of the copolymer (A') and the anti-fogging agent (C). The properties of the laminated film thus obtained are shown in Table 1. As can be seen from Table 1, the anti-fogging properties and the lubricity of the laminated film were inferior to those of Example 1.

COMPARATIVE EXAMPLE 3

Example 1 was repeated in the same manner as described except that an ethylene-butene-1 copolymer (copolymer A') having a density of 0.895 g/cm$^3$ and a butene-1 content of 7.0 mol % and showing two endothermic peaks at 105° C. and 115° C. when analyzed by DSC was substituted for the copolymer (A). The properties of the laminated film thus obtained are shown in Table 1. As can be seen from Table 1, the anti-fogging properties of the laminated film is slightly inferior and the lubricity is slightly superior as compared with the film of Example 1. It is, however, noted that the adhesiveness when heated at a low temperature, haze and gloss of the film of Comparative Example 3 are inferior as compared with the film of Example 1.

From the results shown in Table 1, it is appreciated that the film of Comparative Example 1 using the copolymer (A) by itself shows slightly inferior anti-fogging properties and significantly inferior lubricity as compared with the film of Comparative Example 2 using the copolymer (A') by itself. In combination with the copolymer (B), however, the copolymer (A) gives slightly superior anti-fogging properties and slightly inferior lubricity as compared with the copolymer (A').

TABLE 1

| Example | 1 | | | |
|---|---|---|---|---|
| Comparative Example | | 1 | 2 | 3 |
| Tensile Strength (Kg/cm$^2$) | 1200 | 1100 | 1200 | 1200 |
| Young's Modulus (Kg/cm$^2$) | 2800 | 2500 | 3000 | 3000 |
| Haze (%) | 0.6 | 0.6 | 0.8 | 0.8 |
| Gloss (%) | 151 | 150 | 145 | 143 |
| Anti-fogging properties | | | | |
| Ordinary Temperature | A | B | B | A |
| Low Temperature | A | C | B | A |
| Frozen condition | A | C | C | B |
| Lubricity | | | | |
| Static (μs) | 0.49 | 0.69 | 0.57 | 0.47 |
| Dynamic (μk) | 0.36 | 0.48 | 0.42 | 0.34 |
| Adhesiveness (°C.) | 97 | 95 | 114 | 117 |

EXAMPLE 2

Example 1 was repeated in the same manner as described except that the weight ratio of the copolymer (A) to the copolymer (B) was changed to 95:5. The properties of the laminated film thus obtained are shown in Table 2.

As evident from Table 2, the film of Example 2 gives superior anti-fogging properties and lubricity as compared with the film of Comparative Example 1 but inferior anti-fogging properties and lubricity as compared with the film of Example 1.

EXAMPLE 3

Example 1 was repeated in the same manner as described except that the weight ratio of the copolymer (A) to the copolymer (B) was changed to 50:50. The properties of the laminated film thus obtained are shown in Table 2.

As evident from Table 2, the film of Example 3 gives superior anti-fogging properties and lubricity as compared with the film of Comparative Example 1 but inferior adhesiveness as compared with the film of Example 1.

COMPARATIVE EXAMPLE 4

Example 1 was repeated in the same manner as described except that the ethylene-hexene copolymer (copolymer (B)) was replaced by an ethylene-hexene copolymer having a density of 0.905 g/cm$^3$ and a hexene content of 5.1 mol %. The properties of the laminated film thus obtained are shown in Table 2. As can be seen from Table 2, the anti-fogging properties and the lubricity of the laminated film are inferior to those of Example 1.

COMPARATIVE EXAMPLE 5

Example 1 was repeated in the same manner as described except that an ethylene-hexene copolymer having a density of 0.905 g/cm$^3$ and a hexene content of 5.1 mol % was substituted for the copolymer (A) and that an ethylene-hexene copolymer having a density of 0.912 g/cm$^3$ and a hexene content of 4.5 mol % and showing two endothermic peaks at 82° C. and 119° C. in DSC analysis was substituted for the copolymer (B). The properties of the laminated film thus obtained are shown in Table 2. As can be seen from Table 2, the anti-fogging properties and the lubricity of the laminated film are inferior to those of Example 1.

TABLE 2

| Example | 2 | 3 | | |
| --- | --- | --- | --- | --- |
| Comparative Example | | | 4 | 5 |
| Tensile Strength (Kg/cm$^2$) | 1100 | 1300 | 1200 | 1250 |
| Young's Modulus (Kg/cm$^2$) | 2500 | 3100 | 2700 | 3200 |
| Haze (%) | 0.6 | 0.7 | 0.6 | 0.7 |
| Gloss (%) | 150 | 148 | 149 | 150 |
| Anti-fogging properties | | | | |
| Ordinary Temperature | A | A | B | A |
| Low Temperature | B | A | B | B |
| Frozen condition | B | B | C | C |
| Lubricity | | | | |
| Static (μs) | 0.55 | 0.45 | 0.65 | 0.62 |
| Dynamic (μk) | 0.39 | 0.32 | 0.45 | 0.43 |
| Adhesiveness (°C.) | 95 | 105 | 96 | 100 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A laminated film comprising at least three layers, wherein a core layer comprising a propylene-ethylene copolymer, having an ethylene content of from 2 to 12 mol %, is interposed between two outer layers, each of said outer layers comprising (A) an ethylene-α-olefin copolymer having a density of less than 0.910 g/cm$^3$ but not less than 0.870 g/cm$^3$ and an ethylene content of at least 50 mol % and having only one endothermic peak when analyzed by differential scanning calorimetry, (B) an ethylene-α-olefin copolymer having a density of 0.910–0.935 g/cm$^3$ and an ethylene content of at least 50 mol %, and (C) an anti-fogging agent, the density of (B) being greater by at least 0.008 g/cm$^3$ than that of (A), wherein the weight ratio of (A) to (B) is in the range of 95/5 to 40/60.

2. A laminated film as claimed in claim 1, which is stretched in at least one direction.

3. A method for packaging an article comprising stretch packaging the article with the laminated film of claim 1.

4. A method for packaging a food-containing bray comprising covering said food-containing tray with the laminated film of claim 1 by stretch shrink packaging.

* * * * *

UNITED STATES PATENT AND TRADEMARK OFFICE
CERTIFICATE OF CORRECTION

PATENT NO. : 5,736,260
DATED : April 7, 1998
INVENTOR(S) : HAYASHIDA et al

It is certified that error appears in the above-indentified patent and that said Letters Patent is hereby corrected as shown below:

Col. 10, line 48, "bray" should read --tray--.

Signed and Sealed this

Third Day of November, 1998

*Attest:*

BRUCE LEHMAN

*Attesting Officer*        Commissioner of Patents and Trademarks